US011164136B2

(12) United States Patent
Chee et al.

(10) Patent No.: US 11,164,136 B2
(45) Date of Patent: Nov. 2, 2021

(54) RECOMMENDING PERSONALIZED JOB RECOMMENDATIONS FROM AUTOMATED REVIEW OF WRITING SAMPLES AND RESUMES

(71) Applicant: INTERNATIONAL BUSINESS MACHINES CORPORATION, Armonk, NY (US)

(72) Inventors: Yi-Min Chee, Yorktown Heights, NY (US); Ashish Jagmohan, Irvington, NY (US); Ravindranath Kokku, Yorktown Heights, NY (US); Rong Liu, Sterling, VA (US); Satyanarayana V. Nitta, Cross River, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 331 days.

(21) Appl. No.: 15/245,085

(22) Filed: Aug. 23, 2016

(65) Prior Publication Data
US 2018/0060782 A1   Mar. 1, 2018

(51) Int. Cl.
*G06Q 10/06*   (2012.01)
*G06Q 10/10*   (2012.01)

(52) U.S. Cl.
CPC ... *G06Q 10/06398* (2013.01); *G06Q 10/1053* (2013.01)

(58) Field of Classification Search
CPC .......... G06Q 10/06398; G06Q 10/1053; G06F 40/30
See application file for complete search history.

(56) References Cited

U.S. PATENT DOCUMENTS 6,874,002 B1 *   3/2005   Peleus ............... G06F 17/30616
                                                    707/812
7,496,518 B1 *   2/2009   Cayton ................... G06Q 10/10
                                                    705/321

(Continued)

OTHER PUBLICATIONS

Goksel, Aykut and Aydintan, Belgin, Gender, Business Education, Family Background and Personal Traits; a Multi-Dimensional Analysis of Their Affects on Enterpreneurial Propensity: Findings from Turkey, 2011, International Journal of Business and Social Science, vol. 2, No. 13, pp. 35-48 (Year: 2011).*

(Continued)

*Primary Examiner* — Matthew S Gart
*Assistant Examiner* — Stephen S Swartz
(74) *Attorney, Agent, or Firm* — Intelletek Law Group, PLLC; Gabriel Daniel, Esq.

(57) ABSTRACT

A computer system, method, and computer-readable product for providing data for career advice, such as job or education recommendations, from automated review and analysis of career-related data for an individual, which is at least initially obtained from documents, such as resumes and writing samples. For a designated individual, career-related data is obtained from the documents and an initial personality estimate is created for the designated individual based upon, at least, the obtained career-related data. One or more latent factor models for known career-personality matches are then gathered from a database and a questionnaire is provided to the individual to gather further information and augment the personality estimate. The created personality estimate is integrated with the latent factor model(s) to create career advice data.

26 Claims, 4 Drawing Sheets

(56) References Cited

U.S. PATENT DOCUMENTS

| | | | |
|---|---|---|---|
| 7,502,748 B1 | 3/2009 | Baldwin et al. | |
| 9,015,088 B2* | 4/2015 | Shen | A63F 13/12 |
| | | | 706/16 |
| 9,449,080 B1* | 9/2016 | Zhang | G06F 17/30657 |
| 9,449,091 B1* | 9/2016 | Rao | G06Q 30/0271 |
| 2002/0042786 A1* | 4/2002 | Scarborough | G06Q 10/063 |
| | | | 706/21 |
| 2003/0004783 A1* | 1/2003 | Calderaro | G06Q 10/06 |
| | | | 705/7.28 |
| 2006/0282306 A1* | 12/2006 | Thissen-Roe | G06Q 10/06 |
| | | | 705/7.14 |
| 2010/0082356 A1 | 4/2010 | Verma et al. | |
| 2011/0055098 A1* | 3/2011 | Stewart | G06Q 10/00 |
| | | | 705/321 |
| 2014/0019542 A1* | 1/2014 | Rao | G06Q 30/0269 |
| | | | 709/204 |
| 2014/0074740 A1 | 3/2014 | Phillips et al. | |
| 2014/0095146 A1* | 4/2014 | Pilkington | G06F 17/24 |
| | | | 704/9 |
| 2014/0172732 A1* | 6/2014 | Baladi | G06Q 10/1053 |
| | | | 705/321 |
| 2014/0370485 A1* | 12/2014 | Deane | G09B 7/02 |
| | | | 434/353 |
| 2015/0088774 A1 | 3/2015 | Ortiz | |
| 2015/0120593 A1 | 4/2015 | Madhavan et al. | |
| 2015/0269244 A1* | 9/2015 | Qamar | G06F 17/30598 |
| | | | 705/7.42 |
| 2015/0363744 A1* | 12/2015 | Dugan | G06Q 10/1053 |
| | | | 705/321 |
| 2016/0117942 A1 | 4/2016 | Marino et al. | |
| 2016/0132834 A1 | 5/2016 | Pattabiraman et al. | |
| 2016/0232160 A1* | 8/2016 | Buhrmann | G06F 17/30 |
| 2016/0255034 A1* | 9/2016 | Yuan | H04L 51/32 |
| | | | 709/206 |
| 2016/0379170 A1* | 12/2016 | Pande | G06Q 10/06 |
| | | | 705/321 |
| 2018/0060782 A1* | 3/2018 | Chee | G06Q 10/06398 |

OTHER PUBLICATIONS

Guo, et al., "Optimistic Active-Learning Using Mutual Information," 20th International Joint Conference on Artificial Intelligence (IJCAI), Hyderabad, IN, Jan. 2007.

Karasek et al., "The Job Content Questionnaire (JCQ): An Instrument for Internationally Comparative Assessments of Psychosocial Job Characteristics," Journal of Occupational Health Psychology, vol. 3(4), Oct. 1998, 322-355.

Karatzogolou et al., "Multiverse Recommendation: N-Dimensional Tensor Factorization for Context-Aware Collaborative Filtering," 4th ACM Conference on Recommender Systems (ReeSys) Nov. 2010.

Lee et al., "Fighting Information Overflow With Personalized Comprehensive Information Access: A Proactive Job Recommender," 3rd International Conference on Autonomic and Autonomous System, ICAS, Dec. 2007, ISBN: 9780769527994.

ONET Online (https://www.onetonline.org): Static mapping between career and personality. Personality is assessed through questionnaire.

Powell et al., "Student Portfolios: A Tool to Enhance the Traditional Job Search," Business Communication Quarterly, vol. 61, No. 4, pp. 72, 1998, ISSN: 1080-5699.

* cited by examiner

RECOMMENDING PERSONALIZED JOB RECOMMENDATIONS FROM AUTOMATED REVIEW OF WRITING SAMPLES AND RESUMES

BACKGROUND

The present disclosure relates to computerized systems that can determine semantic information from review of the text of documents. More specifically, the present disclosure relates to a computer system and corresponding methodology to semantically review resumes, writing samples, questionnaires, and other documents including employment-related information about a person and provide comprehensive and robust recommendations regarding employment for that person.

Persons seeking career and employment advice have several avenues to seek advice. The persons can consult another individual, such as career counselor or human resource specialist, and that individual will obtain documents from the person, such as their resume, employment history, perhaps also giving them a questionnaire, and then potentially will also interview the candidate to learn more information about the person. Once the information is gathered by the counselor, she will use her personal experience and knowledge to review and condense the data to arrive at a suggested course of employment or career guidance for the person.

The use of a personal career counselor, however, is an individualized experience and relies upon the experience and training of the counselor. Consequently, the personal career guidance it relies upon individual preferences to emphasize some employment attributes and ignore others. The career guidance is also likely to vary based upon the individual career counselor visited.

There are extant automated career guidance computer systems, often provided through websites on the Internet. The automated systems are capable of parsing data from resumes and other uploaded documents that provide employment related information. The automated systems can also use guided questionnaires provided to applicants across the Internet to get more personalized information from the person that can be utilized for career guidance. The extant systems will then use basic and well-known heuristics to provide career advice based upon the data collected. Simple term matching and other comparisons with known data templates are the most common semantic analysis used given the data of a person using the system. The analysis provided by the automated system can be more consistent and thorough than that provided by a career counselor, but may not be able to perform a deep semantic review of a unique individual to provide very thorough and uniquely tailored career guidance.

SUMMARY

According to an embodiment of the present disclosure, a system, method, and computer readable product is shown for providing data for career advice, such as recommending jobs or education, from automated review and analysis of the career-related data for an individual, which is initially obtained from career-related documents, such as resumes and writing samples. An individual is designated to receive career advice data, such as through a person interacting with a web site or a person inputting an individual's data into the system. Career-related data is then obtained from documents that include career-related data for the designated individual, and a personality estimate is created for the designated individual based upon, at least, the obtained career-related data. One or more of latent factor models are then gathered from a database of the models, where the latent factor models of known-career personality matches based upon, at least, mapping of predetermined personality traits onto career-related data.

A predetermined questionnaire is then provided to the designated individual for gathering additional career-related data to augment the personality estimate. The questionnaire can include optimized iterative questions to determine the personality traits of the designated individual. Upon receipt of the answers to the questions, that data can be integrated with the personality estimate and one or more latent factor models to create the career advice data. The career advice is then created from integrating the created personality estimate with the one or more latent factor models.

In one embodiment, the personality estimate can be based upon, at least, pre-created personality traits that were determined to create the latent factor models. The personality traits can be created based upon multi-dimensional statistical estimates. The system can also be embodied to create and store the one or more latent factor models in a database.

The career-advice data can be outputted to the designated individual in several manners, such as a career recommendation based upon the personality estimate, an educational recommendation, or an optimal matched career with the greatest earning potential. The obtaining of career-related data from one or more documents can be done from gathering data from many types of documents, such as a resume, a writing sample, or a general search of data related to the designated individual. The general search can be of any specific database or even the Internet generally.

In one embodiment, the latent factor models of known-career personality matches can be created based upon, at least, mapping of predetermined personality traits onto career-related data, and storing the one or more latent factor models in a database. Furthermore, integrating the created personality estimate with the one or more latent factor models to create career advice data can be done by creating a job-personality matrix. And in one embodiment, the creation of one or more latent factor models can be performed through utilizing tensor factorization.

DETAILED DESCRIPTION

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. Rather, these exemplary embodiments are provided so that this disclosure will be thorough and complete and will fully convey the scope of the present disclosure to those skilled in the art. In the description, details of well-known features and techniques may be omitted to avoid unnecessarily obscuring the presented embodiments.

Figure 1:
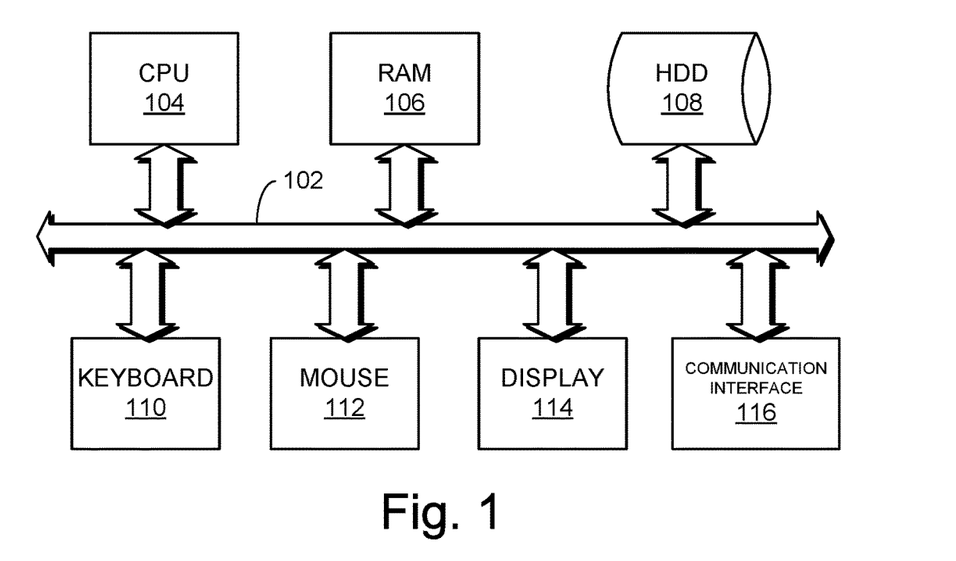
FIG. 1 is a block diagram that shows examples of hardware used according to one embodiment of the present disclosure.

As shown in FIG. 1, a block diagram illustrates computer hardware utilized to realize the system configuration and processing of the present disclosure. CPU (central processing unit) 104, RAM (main memory) 106, HDD (hard disk drive) 108, Keyboard 110, Mouse 112 and Display 114 are connected to a system bus 102. CPU 104, in an embodiment of the present disclosure, is preferably based on a 32-bit or 64-bit architecture. For example, Intel® or Athlon™ chips can all be used. RAM 106, in an embodiment of the present disclosure, normally has a storage capacity Gigabytes or Terabytes.

In FIG. 1, HDD 108, in an embodiment of the present disclosure, has capabilities that include storing a program that can execute the processes described herein. For example, a program, such as Apache™, can be stored for operating the system as a Web server. HDD 108, in an embodiment of the present disclosure, can store an executing application that includes one or more library software modules, such as those for the Java™ Runtime Environment program for realizing a JVM (Java™ virtual machine).

Figure 2:
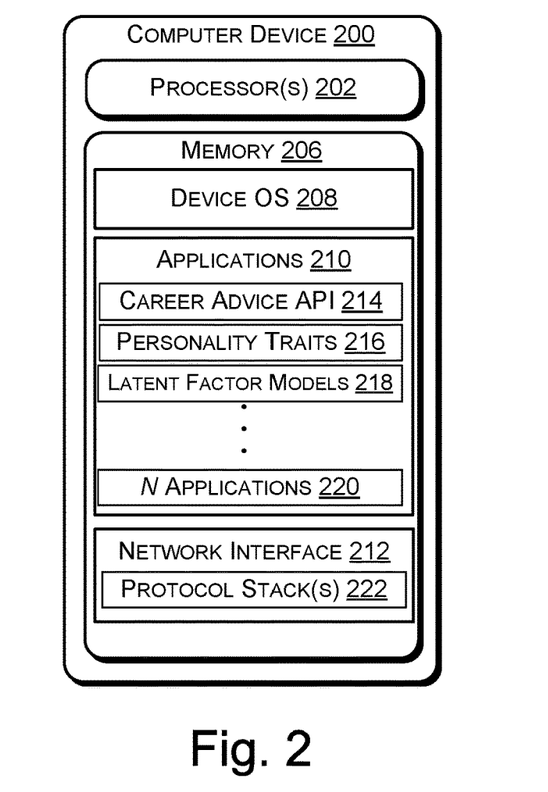
FIG. 2 is a representative diagram of computer components that perform the automated review of career-related data within documents, such as resumes, and writing samples, and can provide career advice to a designated individual.

Additionally, in FIG. 1, a Keyboard 110 and Mouse 112 can be used to manipulate graphic objects, such as icons, task bars and text boxes displayed on Display 114 in accordance with the graphic user interface provided by a device operating system (OS) 208 in FIG. 2. Display 114, in FIG. 1, in one embodiment of the present disclosure, is a 32-bit true color LCD monitor with a resolution of at least 1024×768. Display 114 is used, for example, to display the results of operations performed by an application program executed, such as a software application being executed in a JVM.

Communication Interface 116, in FIG. 1, in one embodiment, is connected to a network using the Ethernet® protocol. In the present disclosure, Communication Interface 116 receives processing requests in accordance with a communication protocol, for example TCP/IP, from another computer (not shown) using functions provided by a program, for example in one embodiment, Apache, and processing results are sent to the another computer (not shown). The communication interface 116, in one embodiment, can be accessed by a designated individual across the Internet or a private network to interact the system as described herein.

FIG. 2 illustrates exemplary components of a computer device 200 that can perform the automated process to gather career-related data and provided career advice as described herein. An example of the computer device 200 can be the CPU 104 in FIG. 1, working there with main memory 106 and HDD 108. The computer device 200 may include one or more processor(s) 202, and a memory 206 storing a device OS 208, various software applications 210 configured to request/receive data over the network, and a network interface module 212.

In various embodiments, the applications 210 stored at the computer device 200 may include, but are not limited to, a career advice API 214, the personality traits 216 to be used in the process, and stored latent factor models 218 to be used in providing the career advice, and so on, through an Nth software application 220. During execution on the computer device 200, each of the applications 210 may be configured to cause the computer device 200 to initiate data communications with other devices across the network. In this embodiment, the career advice API 214 can be displayed to the designated individual seeking career guidance, or can be accessed by a person attempting to obtain career advice for a different designated individual, such as a job applicant, further described herein.

The computer device 200 may be also configured to communicate over a telecommunications network using any common wireless and/or wired network access technology. Moreover, the computer device 200 may be configured to run any compatible device OS, including but not limited to, Microsoft Windows Mobile®, Google Android®, Apple iOS®, Linux Mobile®, as well as any other common mobile device OS. The resident device OS 208 may have one or more resident diagnostic applications or tools, such as Android Debug Bridge, that can be executed to generated diagnostic information for the computer device 200.

Each of the one or more processor(s) 202 can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 202 may be configured to execute each of the software applications 210 stored in the memory 206. In various embodiments, the network interface module 212 may be configured to detect an action (e.g., operation, command, user input) directed to one of the applications 210, the action triggering the generation of a data transfer request and a transmission of the data transfer request.

The memory 206 may be implemented using computer readable media, such as computer storage media. In various embodiments, the memory 206 may store a virtual computer device. In various embodiments, the multiple layers may also correspond to the Internet Protocol (IP) suite. For example, in various embodiments, the computer device 200 may execute a program on each of a physical layer, a data link/radio layer, a network layer/Internet layer, a transport layer, a session layer, a presentation layer, and an application layer, as a data packet is generated and configured amongst the layers for communication from the computer device 200 to the other computer devices.

FIG. 2 is an example of the computer device 200 having local storage of personality traits 216 and latent factor models 218. If the computer device 200 is so embodied so as to create the personality traits 216 and later factor models 218 be locally stored in either temporary or permanent manner. Moreover, the personality traits 216 and latent factor models 218 can also be remotely located and accessible to the computer device 200 and a staged-storage of items may be used, wherein more likely to be used data is stored in resident memory 206, while less likely data is stored at a remote database, such as database 108 in FIG. 1.

The present disclosure may be a system, a method, and/or a computer program product. The computer program product may include a computer readable storage medium (or media) having computer readable program instructions thereon for causing a processor to carry out aspects of the present disclosure.

It should be appreciated that the computer readable storage medium can be a tangible device that can retain and store instructions for use by an instruction execution device. For example, the computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
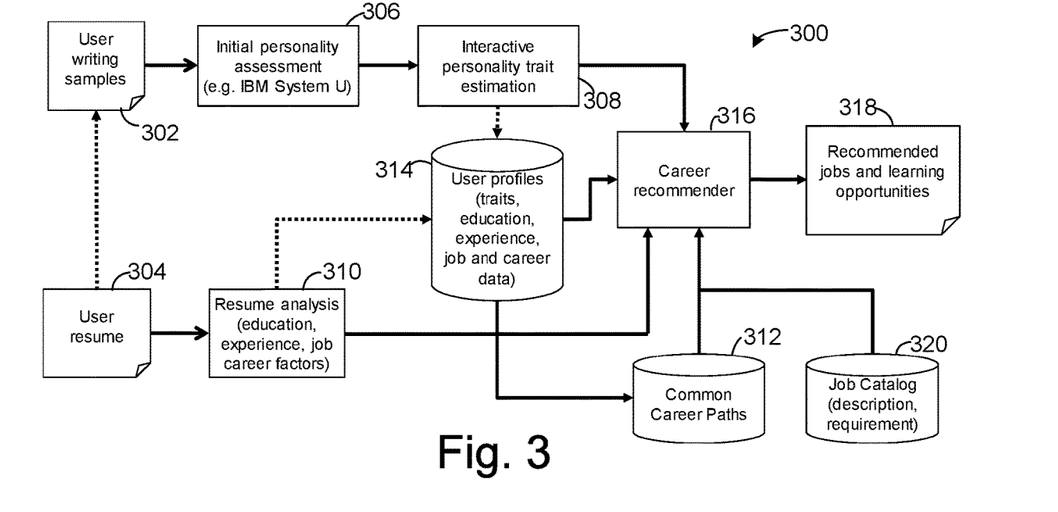
FIG. 3 is a representative diagram of the high-level components of the system that performs the automated process to gather career-related data and provide career-advice.

FIG. 3 is a representative diagram of the high-level components of the system 300 that performs the automated process to gather career-related data and provide career-advice. Personality assessments from writing samples 302 can be combined with questionnaire-based personality assessment (see FIGS. 4A, 4B and 5) through an interactive, adaptive active-learning framework. In one embodiment, form a multi-dimensional statistical estimate of personality, along different personality axes, such as curious, practical, challenging, creative (see, e.g. chart 502 in FIG. 5). Writing samples 302 can be obtained either from direct input by a designated individual to receive the career advice, or can be retrieved from another location. Then an initial personality estimate is obtained by assessment of writing samples, e.g. using initial personality assessment 306. The initial personality assessment 306 is simply one example of an intelligent system that can determine the initial personality profile of the designated individual user, which in this embodiment is a user. One example of the assessment is the proprietary IBM System U.

Through the use of the initial personality estimate, the generation of more accurate career advice is possible because the data gathering process will commence with more tailored guidance for the later questioning and refinement. Thus, in one embodiment, the initial personality estimate can be considered a Bayesian prior from which to commence the career advice-generating process.

The initial personality assessment 306 yields an interactive personality trait estimation, as shown at block 308, to then generate a basic user profile 314, that at least includes the personality of the user in a quantified manner. Then a career recommender 316 can be at least initially determined, at least based on the writing samples 302, or in conjunction with the user resume 304.

The writing samples 302 are used for the initial personality estimate 306 because they tend to give a better insight than a raw input of career data that is often disclosed in user resumes 304. The writing samples 302 can be a general writing sample of the designated individual that may or may not have been created with respect to a specific employment. The writing samples 302 could also have been requested by the system 300 with respect to gathering information on a specific personality trait of the designated individual, and can be iterative to obtain the most optimal information.

In this embodiment, the user resumes 304 and their corresponding career-related data are gathered and analyzed, as shown at block 310. The resume can be used to gather career duration data, either for a specific job or in a specific career area. This is useful information in determining what career area the user has the most experience in and likely a preference for. The analyzed career-related data is then routed and utilized in several different manners. The data can be routed to a common career paths database 312 to link the previous jobs to the common career paths such that current career paths can be determined or suggested for the designated individual. The information from the common career paths database 312 is then combined with a job catalog database 320, which can include deeper information on the career paths, such as experience and education required for the job. The combined information on common career paths and job catalog can then be provided to the career recommender, at block 316.

Returning to the analysis of resumes at block 310, such analysis can also be provided to the user profile database 314 to augment the data stored thereat. In such manner, it can be seen that the entire process of data collection here can be integrated among the components to refine the recommended jobs. On the career recommender is used to generate one or more potential career paths at block 316, then the recommended jobs and/or any needed education or learning opportunities can be outputted to the user/designated individual, as shown at block 318.

Figure 4A:
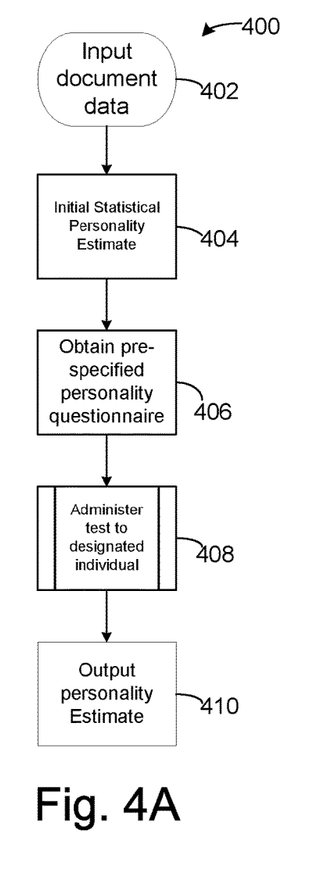
FIG. 4A is one embodiment of a process to intake career-related data for a designated individual and generate a personality estimate for the individual.

FIG. 4A is one embodiment of a process 400 to intake career-related data for a designated individual and generate a personality estimate for the individual. The career-related document data is input, as shown at start process 402, and then an initial statistical personality estimate is made for the individual, as shown at step 404. The initial estimate could be embodied as in the initial personality assessment 306 in FIG. 3 or another deep semantic method to generate an initial personality estimate can be alternately utilized. In this embodiment, then a pre-specified personality questionnaire is obtained, as shown at step 406, to get information from the designated individual to augment the initial personality estimate. A predetermined process 408, as more specifically defined in the FIG. 4B, then administers a questionnaire to the designated individual, and then the personality estimate is output, as shown at step 410. The output can be to the user profile database in FIG. 3, or can be to other modules and subprocesses being utilized herein to generate the career-advice.

Figure 4B:
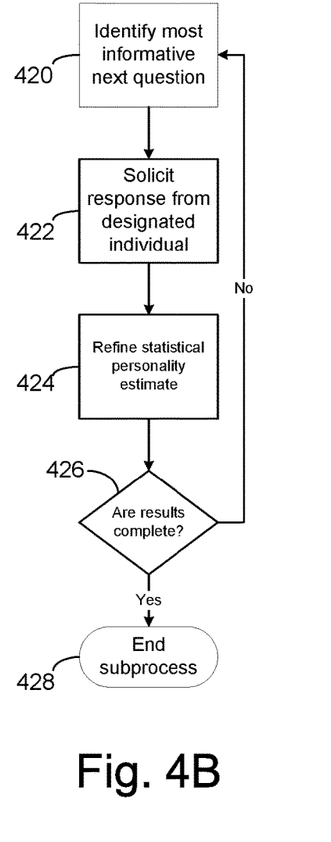
FIG. 4B is a one embodiment of the subprocess 408 in FIG. 4A, for utilizing a guided questionnaire directed to the designated individual to augment the career-advice.

FIG. 4B is a one embodiment of the subprocess 408 in FIG. 4A, for utilizing a guided questionnaire directed to the designated individual to augment the career-advice. A most-next informative question is identified, as shown at step 420, and then a response is solicited from the designated individual, as shown at step 422. In this embodiment, from pre-specified set of personality assessment questions, the subprocess will identify next question which maximizes incremental information about the personality estimate. Then once the receipt of the answer from the designated individual is obtained, the statistical personality estimate is refined, as shown at step 424, and a determination is then made as to whether the personality estimate results are complete, as shown at decision 426. The subprocess iteratively refines personality assessment until a termination criterion is satisfied. In such manner, the process can provide an improved personality assessment than raw text-based or question-based assessments alone.

If the results are not complete at decision 426, then the process iterated to identify the most informative next question at step 420. Otherwise, if the results are complete at decision 426, then the subprocess is ended, as shown at termination 428, and the process returns to step 410 in FIG. 4A.

Figure 5:
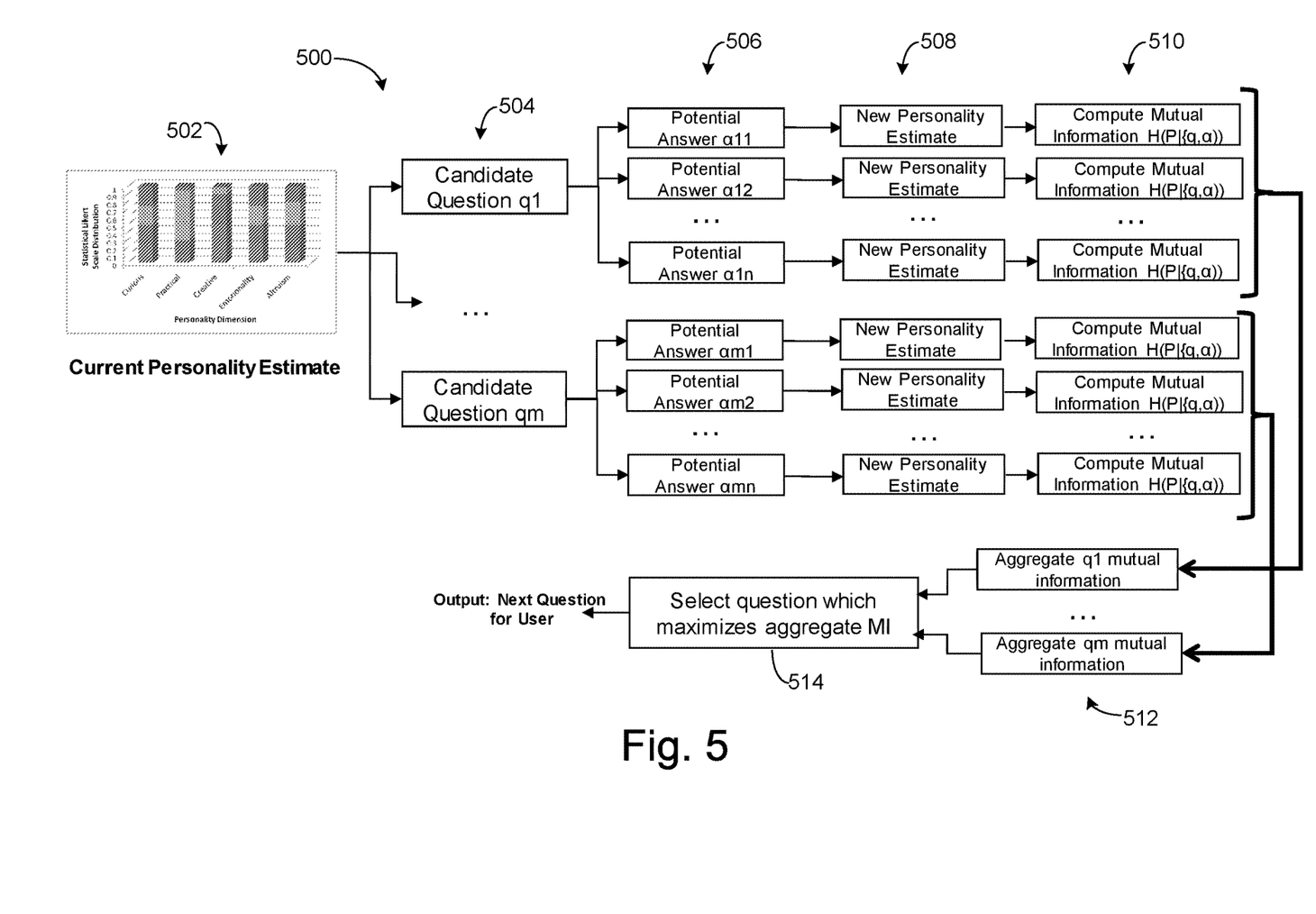
FIG. 5 is a representative data flow of one embodiment of the guided questionnaire providing and integrating a series of questions and responses to the designated individual.

FIG. 5 is a representative data flow 500 of one embodiment of the guided questionnaire providing and integrating a series of questions and responses to the designated individual. The process produces a chart 502 that give a current personality estimate for the designated individual, and then one or more candidate questions, q1 through qm, shown at column 504, are reviewed with the potential best question to optimize the personality estimate determined. Then the question is sent to the designated individual, which in one embodiment is shown in the process of FIG. 4B. The candidate questions 504 can be sent out in sequence or in parallel and the process can likewise occur in sequence or in parallel, but here is illustrated as in parallel at least in determining the next optimal question to ask the designated individual.

The range of potential answers are pre-filtered here to lessen computational complexity, as shown by column 506 of the potential answers. Thus, for n answers for M questions, the data set for analysis will be M×n, as shown in column 510. The potential answers impact on the new personality sub-estimate 508 is then generated and the mutual information is computed for each new personality sub-estimate and the current personality estimate, as shown by column 510. This step unifies the new personality information into units that are then aggregated into specific information relating to specific questions, as shown at column 512, where each potential question is vetted to determine the greatest movement or best refinement of the new personality estimate. The aggregate can be performed in a variety of manners, such as simple data matching, average responses, pattern recognition, largest or average mutual information (MI) or other methods know in the art. Then the next question to ask is determined, which, in this embodiment, maximizes the aggregate mutual information (MI), as shown at block 514. The next question is then output to the user. An example of this output step can be step 422 in the subprocess of FIG. 4B.

The present method shown is a brute-force parallel predictive method to determine the optimal next question to ask the designated individual. Other methods, such as a Monte Carlo simulation or other random or purposeful iterative processes, can be utilized in the system to predict the optimal next question likely to give better career guidance.

Figure 6:
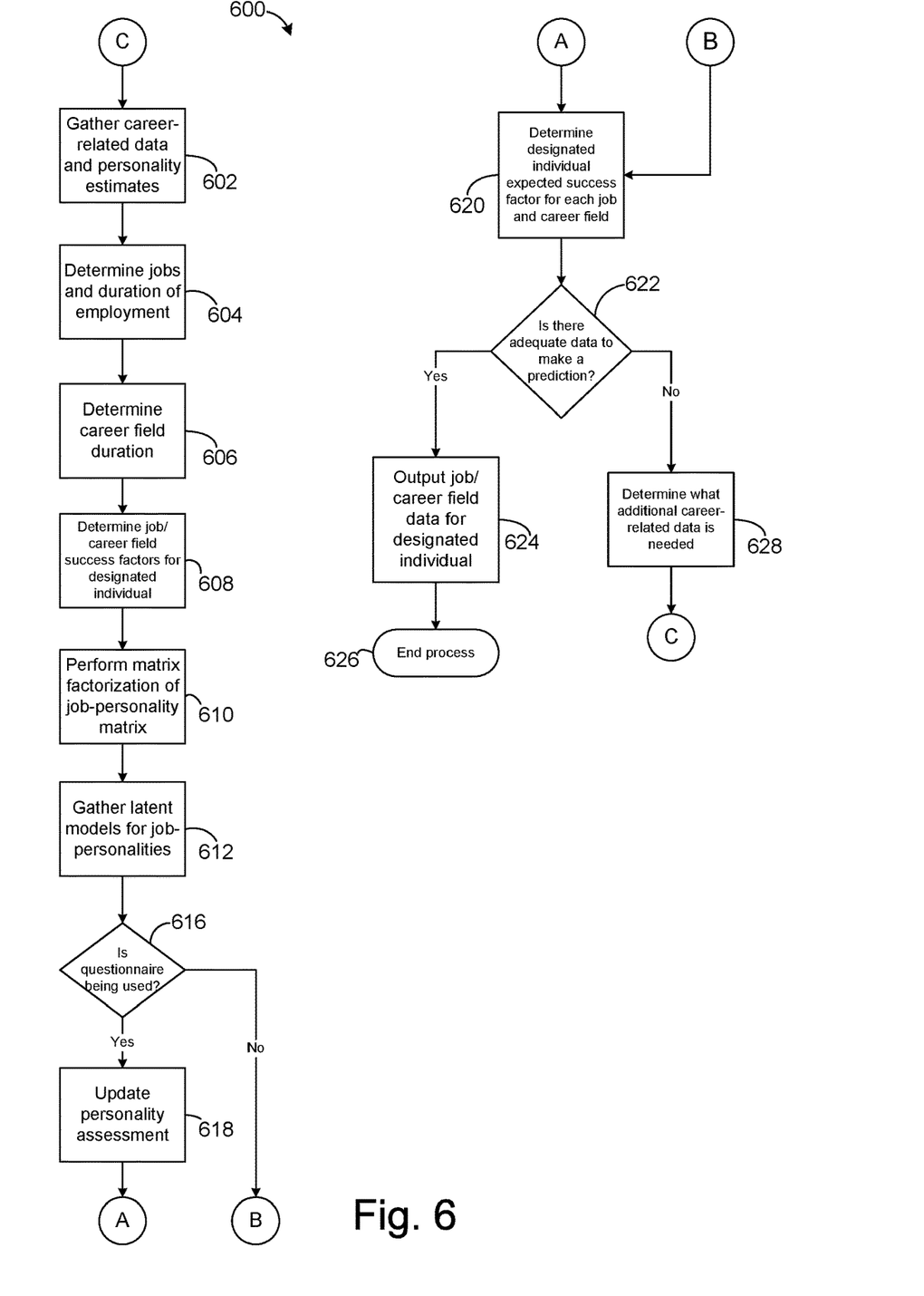
FIG. 6 is a flowchart of one embodiment of a process to gather the career-related data and personality information and integrating the information into career advice data to be output to the designated individual, or modifying the career advice before output, if necessary.

FIG. 6 is a flowchart of one embodiment of a process 600 to gather the career-related data and personality information and integrate the information into career advice data to be output to the designated individual, or modify the career advice before output, if appropriate. The process starts with the system 300 (FIG. 3) gathering career-related data and personality estimates, as shown at step 602. Embodiments of this can be the gathering of writing samples (block 302) and resumes (block 304) in FIG. 3. Then, the nature of the jobs and their duration of employment for the designated individual are determined, as shown at step 604, and the career field duration for the designated individual is determined as shown at step 606.

An initial determination of the job/career field success factors are then made for the designated individual, as shown at step 608. This initial determination of success factors allows a job-personality matrix to be created for the designated individual, as shown at step 610. In one embodiment, the matrix can be created via matrix factorization, as would be known to one of skill in the art. The latent factor models job personalities are gathered, as shown at step 612, and then a determination is made as to whether the questionnaire needs to be provided to the designated individual, as shown at decision 616. If the questionnaire does not need to be utilized at decision 616, then the process forward to determine the designated individual's expected success factor for each job and career field, as shown at step 620.

Otherwise, if the questionnaire is being used at decision 616, then the questionnaire, such as those described in FIGS. 4A, 4B and 5, is administered to the designated individual and the personality assessment is updated, as shown at step 618. After updating the personality assessment, the expected success for the designated individual is determined at step 620. After the expected success is determined, then a determination is made as to whether there is adequate data to make a prediction of job success for the designated individual, as shown at decision 622. If there is adequate data at decision 622, then the job and field information is output for the designated individual, as shown at step 624, and the process terminates, as shown at termination 626. The output in step 624 could be a job list.

Otherwise, if there is not adequate data to make a prediction at decision 622, then a determination is made on what additional career-related data is needed, as shown at step 628, and the process iterated to step 602 to again gather more career-related data. In such manner, the process can continue until reliable career-advice can be given for the designated individual, such as specific jobs, career field areas, and potential educational needs and opportunities.

It should further be appreciated that the reports and information that the system can provide are not limited in their nature. The reports can be individualized recommendations to a person that is directly utilizing the system 300 to receive career guidance. The reports can also be for an employer or other third party that would like a recommendation on the potential employability of an individual. It should also be appreciated that other data can be utilized and integrated with the career-related data to potentially enhance the career advice, such as psychological profiling, search data of social media and Internet searches generally, searches of credit agencies, and other personal information databases.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. Rather, these exemplary embodiments are provided so that this disclosure will be thorough and complete and will fully convey the scope of the present disclosure to those skilled in the art. In the description, details of well-known features and techniques may be omitted to avoid unnecessarily obscuring the presented embodiments.

What is claimed is:

1. A computer implemented method of providing data for career advice from an automated review and an analysis of the career-related data for an individual, comprising:

designating an individual for which career advice data is to be created;

obtaining, by a computing device, career-related data, from one or more documents that include career-related data for the designated individual, wherein the one or more documents include a writing sample that has not been created with respect to a specific employment;

creating, by the computing device, an initial personality estimate for the designated individual based upon, at least, the obtained career-related data including the writing sample;

gathering, by the computing device, one or more latent factor models for known career-personality matches from a database of latent factor models;

determining, by the computing device, at least one question to ask the designated individual, using the initial personality estimate based upon at least the writing sample as a Bayesian prior for the at least one question to ask, thereby lessening computational complexity, to optimize the personality estimate;

sending, by the computing device, the at least one question to the designated individual and selectively receiving data indicative of an answer thereto from the designated individual;

refining, by the computing device, the personality estimate based on the answer;

upon determining, by the computing device, that the personality estimate is not complete, returning to the act of determining at least one question to ask; and integrating, by the computing device, the created personality estimate with the one or more latent factor models and the at least one answer to create career advice data.

2. The method of claim 1, further comprising:
creating one or more latent factor models of known-career personality matches based upon, at least, a mapping of predetermined personality traits onto career-related data; and
storing the one or more latent factor models in a database.

3. The method of claim 2, wherein creating one or more latent factor models includes utilizing a tensor factorization.

4. The method of claim 1, further comprising integrating career duration data for the designated individual into the latent factor models to create career advice data.

5. The method of claim 1, wherein integrating the created personality estimate with the one or more latent factor models to create the career advice data comprises creating a job-personality matrix.

6. A computer system for providing data for career advice from automated review and analysis of the career-related data for an individual, the computer system comprising:
a processor, a computer-readable memory, a computer-readable tangible storage device, and program instructions stored on the storage device for execution by at least the processor via the memory, wherein the computer system is configured to:
designate an individual for which career advice data is to be created;
obtain career-related data from one or more documents that include career-related data for the designated individual, wherein the one or more documents include a writing sample that has not been created with respect to a specific employment;
create a personality estimate for the designated individual based upon, at least, the obtained career-related data;
gather one or more latent factor models for known career-personality matches from a database of latent factor models;
determine at least one question to ask the designated individual, using the initial personality estimate based upon at least the writing sample as a Bayesian prior for the at least one question to ask, thereby lessening computational complexity, to optimize the personality estimate;
send the at least one question to designated individual and selectively receive data indicative of an answer thereto from the designated individual;
refine the personality estimate based on the answer;
upon determining that the personality estimate is not complete, returning to the act of determining at least one question to ask; and
integrate the created personality estimate with the one or more latent factor models and the at least one answer to create career advice data.

7. The system of claim 6, wherein the computer system is further configured to output the career-advice data to the designated individual.

8. The system of claim 6, wherein the computer system is further configured to:
create one or more latent factor models of known-career personality matches based upon, at least, a mapping of predetermined personality traits onto career-related data; and
store the one or more latent factor models in a database.

9. The system of claim 8, wherein the computer system is further configured to create one or more latent factor models by utilizing tensor factorization.

10. The system of claim 6, wherein the computer system is further configured to integrate career duration data for the designated individual into the latent factor models to create career advice data.

11. The system of claim 6, wherein the computer system is further configured to integrate the created personality estimate with the one or more latent factor models to create career advice data by creating a job-personality matrix.

12. A computer program product for providing data for career advice from automated review and analysis of career-related data for an individual, the computer program product comprising a non-transitory computer readable storage medium having program instructions embodied therewith, the program instructions executable by a computer to cause the computer device to:
designate an individual for which career advice data is to be created;
obtain career-related data from one or more documents that include career-related data for the designated individual, wherein the one or more documents include a writing sample that has not been created with respect to a specific employment;
create a personality estimate for the designated individual based upon, at least, the obtained career-related data;
gather one or more latent factor models for known career-personality matches from a database of latent factor models;
determine at least one question to ask the designated individual, using the initial personality estimate based on a writing sample as a Bayesian prior for the at least one question to ask, thereby lessening computational complexity, to optimize the personality estimate;
send the at least one question to designated individual and selectively receive data indicative of an answer thereto from the designated individual;
refine the personality estimate based on the answer;
upon determining that the personality estimate is not complete, returning to the act of determining at least one question to ask; and
integrate the created personality estimate with the one or more latent factor models and the at least one answer to create career advice data.

13. The computer program product of claim 12, wherein execution of the code further causes the computer device to output the career-advice data to the designated individual.

14. The computer program product of claim 12, wherein execution of the code further causes the computer device to:
create one or more latent factor models of known-career personality matches based upon, at least, mapping of predetermined personality traits onto career-related data; and
store the one or more latent factor models in a database.

15. The computer program product of claim 14, wherein execution of the code further causes the computer device to create one or more latent factor models by utilizing tensor factorization.

16. The computer program product of claim 12, wherein execution of the code further causes the computer device to integrate career duration data for the designated individual into the latent factor models to create career advice data.

17. The computer program product of claim 12, wherein execution of the code further causes the computer device to integrate the created personality estimate with the one or more latent factor models to create career advice data by creating a job-personality matrix.

18. A computer system for providing data for career advice from automated review and analysis of career-related data for an individual, comprising:
- input means for designating an individual for which career advice data is to be created;
- retrieval means for obtaining career-related data from one or more documents that include career-related data for the designated individual, wherein the one or more documents include a writing sample that has not been created with respect to a specific employment;
- personality estimate creation means for creating a personality estimate for the designated individual based upon, at least, the obtained career-related data;
- the retrieval means further for obtaining one or more latent factor models for known career-personality matches from a database of latent factor models;
- questioning means for determining at least one question to ask the designated individual, using an initial personality estimate based on a writing sample as a Bayesian prior for the at least one question to ask, thereby lessening computational complexity, to optimize the personality estimate, the questioning means further for sending the at least one question to designated individual and selectively receiving data indicative of an answer thereto from the designated individual;
- refining the personality estimate based on the answer;
- upon determining that the personality estimate is not complete, returning to questioning means; and
- integration means for integrating the created personality estimate with the one or more latent factor models and the at least one answer to create career advice data.

19. The system of claim 18, further comprising output means for outputting the career-advice data to the designated individual.

20. The system of claim 18, wherein the integration means further for integrating career duration data for the designated individual into the latent factor models to create career advice data.

21. A computer implemented method of providing data for career advice from automated review and analysis of the career-related data for an individual, comprising:
- creating one or more personality traits based upon multi-dimensional statistical estimates;
- creating one or more latent factor models of known-career personality matches based upon, at least, mapping of predetermined personality traits onto career-related data;
- storing the one or more latent factor models in a database;
- designating an individual for which career advice data is to be created;
- obtaining career-related data from one or more documents that include career-related data for the designated individual, wherein the one or more documents include a writing sample that has not been created with respect to a specific employment;
- creating a personality estimate for the designated individual based upon, at least, the obtained career-related data, the personality estimate based upon, at least, the created personality traits;
- gathering one or more of the latent factor models;
- determining at least one question to ask the designated individual, using the personality estimate based upon at least the writing sample as a Bayesian prior for the at least one question to ask, thereby lessening computational complexity, to optimize the personality estimate;
- sending the at least one question to designated individual and selectively receive data indicative of an answer thereto from the designated individual;
- refining the personality estimate based on the answer;
- upon determining that the personality estimate is not complete, returning to the act of determining at least one question to ask; and
- integrating the created personality estimate with the one or more latent factor models and the at least one answer to create career advice data.

22. The method of claim 21, further comprising outputting the career-advice data to the designated individual as at least one of:
- a career recommendation based upon the personality estimate;
- an educational recommendation; or
- an optimal matched career with the greatest earning potential.

23. The method of claim 21, wherein obtaining career-related data from one or more documents that include career-related data for the designated individual comprises gathering data from at least one of:
- a resume;
- the writing sample; and
- a general search of data related to the designated individual.

24. The method of claim 21, further comprising integrating career duration data for the designated individual into the latent factor models to create career advice data.

25. The method of claim 1, wherein a writing sample is only used for the creation of the initial personality estimate and not part of the at least one question to ask.

26. The method of claim 1, further comprising creating one or more personality traits based upon multi-dimensional statistical estimates.

* * * * *